Aug. 9, 1966    P. L. FINELLI    3,264,963
PHOTOGRAPHIC APPARATUS
Filed May 6, 1964    5 Sheets-Sheet 1

INVENTOR.
Patrick L. Finelli
BY Brown and Mikulka
and
Charles S. McGuire
ATTORNEYS Aug. 9, 1966　　　P. L. FINELLI　　　3,264,963
PHOTOGRAPHIC APPARATUS Filed May 6, 1964　　　　　　　　　5 Sheets-Sheet 3

INVENTOR.
Patrick L. Finelli
BY Brown and Mikulka
and
Charles J. McGuire
ATTORNEYS Aug. 9, 1966 P. L. FINELLI 3,264,963
PHOTOGRAPHIC APPARATUS
Filed May 6, 1964 5 Sheets-Sheet 5

INVENTOR.
Patrick L. Finelli
BY Brown and Mikulka
and
Charles S. McGuire
ATTORNEYS United States Patent Office 3,264,963
Patented August 9, 1966

3,264,963
PHOTOGRAPHIC APPARATUS
Patrick L. Finelli, Sudbury, Mass., assignor to Polaroid Corporation, Cambridge, Mass., a corporation of Delaware
Filed May 6, 1964, Ser. No. 365,868
14 Claims. (Cl. 95—13)

The present invention relates to photographic apparatus and, more specifically, to novel apparatus suitable for incorporation in a camera or the like to aid in the processing of photographic materials, portions of which have been exposed therein.

Generally, the present invention is concerned with photographic apparatus of the type wherein a photosensitive sheet material, preferably comprising photosensitive silver halide, is exposed and is thereafter treated with a fluid reagent in conjunction with another sheet material to produce photographic prints, preferably by a process involving the transfer of image-forming substances resulting from the development of the latent image in the exposed photosensitive silver halide. A variety of forms of apparatus of this type, with which the present invention is concerned, have been proposed and as a general rule include means for storing and positioning for exposure one or more exposure frames of photosensitive sheet material, means for storing one or more areas of a second sheet material superposable with the exposure frames, means preferably in the form of a plurality of rupturable containers holding a fluid processing reagent for distribution between each exposed frame of the photosensitive sheet and an area of the second sheet, and means for superposing one set or a succession of sets of frames and areas of the photosensitive and second sheets and distributing the fluid processing reagent from the containers in a thin layer between each frame and area. This last-mentioned means for superposing an exposed frame and area of two sheets and distributing a fluid processing reagent therebetween comprises a pair of juxtaposed pressure-applying members, usually rolls, between which the sheets are moved in superposition for spreading the fluid, usually provided in a rupturable container located between the sheets, between the superposed frame and area.

In apparatus of the type with which the present invention is concerned, the exposure frames of the photosensitive material are provided as individual sheets, the areas of a second sheet material to be superposed wtih the exposure frame are also provided as individual second sheets, and the fluid processing reagent is provided in a plurality of rupturable containers each adapted to be located between a photosensitive and second sheet during movement of the sheets in superposition between a pair of pressure-applying members. A photosensitive sheet may be exposed while it is located in superposition with a second sheet, or, as in the more common practice, the photosensitive and second sheets are provided in separate stacks, exposure of each photosensitive sheet being effected when it is spaced apart from its corresponding second sheet; thereafter the two sheets are moved in superposition between a pair of pressure-applying members. For this purpose each sheet or pair of sheets is provided with an attached leader or leaders which projects from the apparatus within which the photosensitive sheet is exposed, and may be grasped for drawing each pair of sheets between the pressure-applying members.

Among the requirements of film units and the apparatus through which they are advanced to effect distribution of the processing agent between the sheets is an effective means for preventing escape of a portion of the fluid from between the lateral edges of the sheets. A number of expedients have been suggested for meeting this requirement and may be found, for example, in U.S. Patents Nos. 3,113,500 of William H. Eburn et al., issued December 10, 1963, and 3,080,805 of Joel A. Hamilton, issued March 12, 1963, and copending U.S. application Serial No. 203,265 of Rogers B. Downey, filed June 18, 1962, now Patent No. 3,132,572.

A second requirement for achieving the desired qualities of the processed photosensitive sheets is apparatus which effects distribution of the processing fluid in a uniformly thin layer over the entire processing area. Various forms of pohtographic apparatus have also been proposed for aiding in the proper distribution of the fluid and include, for example, those shown in U.S. Patent No. 2,991,703 of Vaito K. Eloranta, issued July 11, 1961, and copending U.S. application Serial No. 299,787 of Otto E. Wolff, filed August 5, 1963.

When the format of the film units is similar to that shown, for example, in the above-mentioned Eloranta Patent 2,991,703 a third requirement of the apparatus arises. In such film units the photosensitive element is exposed and thereafter advanced through the apparatus to a position adjacent the second sheet which meanwhile remains stationary. After the two sheets have been aligned they are advanced in superposition between the pressure-applying members for distribution of the processing fluid. Since the photosensitive sheet and other elements of the film unit may be in sliding engagement with the second sheet, it is necessary to provide some means for maintaining the second sheet in its initial position until the photosensitive sheet has been moved into superposition therewith. Means for accomplishing this function are suggested, for example, in the above-mentioned Eburn et al. Patent 3,113,500 and copending U.S. application Serial No. 54,740 of Vaito K. Eloranta, filed September 8, 1960, now Patent No. 3,222,170.

It is a principal object of the present invention to provide photographic apparatus through which a film unit may be advanced to effect processing thereof and which includes unitary means providing proper distribution of a processing fluid wtihin the film unit, prevents the fluid from escaping from between lateral edge portions of the film unit and aids in the proper transport of the film unit through the apparatus.

A further object is to provide, in combination with photographic apparatus having a pair of pressure-applying members between which a film unit is advanced to effect spreading of a processing fluid between two superposed sheets of the film unit, a simple and inexpensive device which may conveniently be fabricated as a single element to assist in the proper transport of the film unit through the apparatus and proper distribution of the processing fluid.

A still further object is to provide, in photographic apparatus having a pair of pressure-applying members between which a film unit is advanced to effect distribution of a processing fluid, a pair of flexible elements, one at each side of the pressure-applying members and closely adjacent thereto, for engagement with lateral edge portions of the film unit as the latter is advanced and which maintain one element of the film unit stationary while a second element is being moved relative thereto and which prevent escape of a processing fluid from between lateral edge portions of the film unit by engaging such edge portions between the flexible elements and one of the pressure-applying members.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
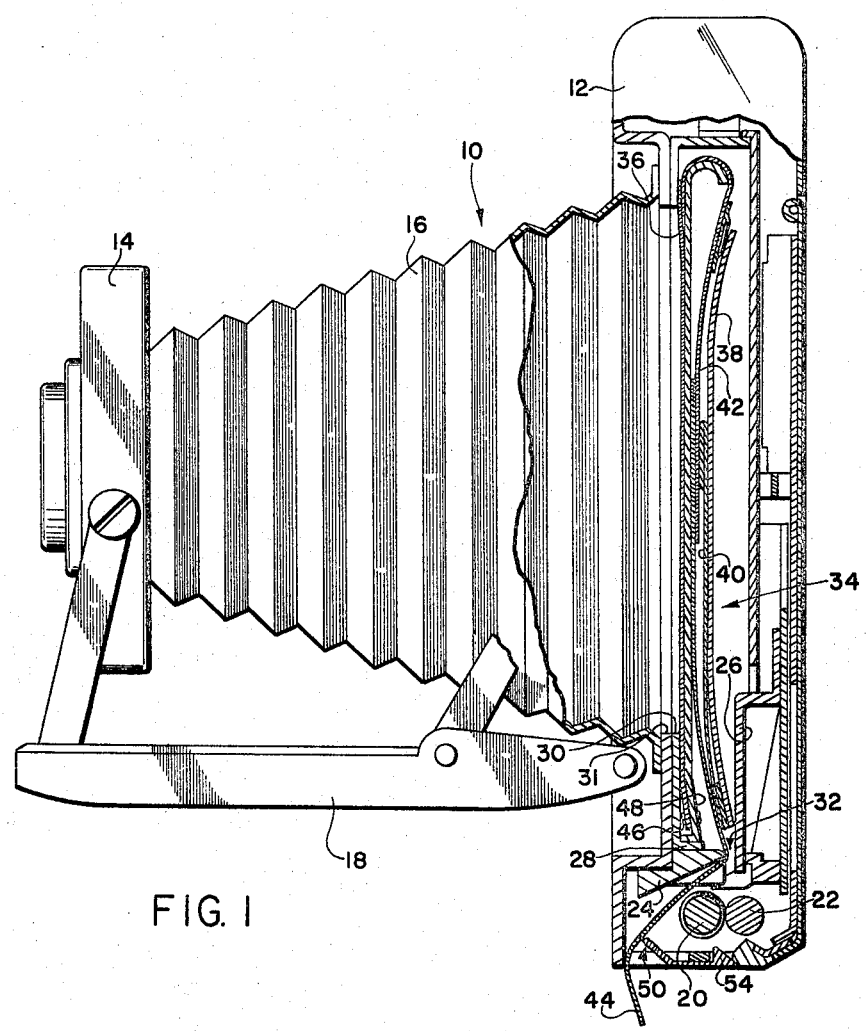
FIGURE 1 is a side elevational view, partly in cross section, of a self-developing camera embodying the apparatus of the present invention.

The apparatus described herein finds particular application in a camera, in conjunction with a plurality of film assemblies of a type which comprises a first sheet material having a photosensitive emulsion, flexible strip materials interconnecting with a second sheet which may, appropriately, serve as a carrier or support for the final positive image and which, when thus employed, may be called the image-receiving sheet, and a rupturable container releasably holding a processing liquid mounted on the interconnecting strip materials and so positioned as to release the processing liquid between the emulsion and the second sheet. As known in the art, the second sheet may serve merely as a barrier layer, the image being formed elsewhere in the assembly. Each film assembly also includes a first, releasably attached leader or tab which, to avoid confusion with a second leader, will be termed a "tab" throughout the present specification, and which is positioned to extend through a first exit aperture of the camera so that, when it is pulled, manually, during a first or positioning stage, it serves to remove the first sheet from a location at which it has undergone photographic exposure and advance it to a location whereat the emulsion is superimposed and contiguous with the second or image-receiving sheet. The film assembly also includes a second tab or leader which extends from the interconnecting strip materials and which will be termed a "leader" herein to differentiate from the aforesaid tab. Continued drawing upon the tab advances the leader between a pair of pressure rolls so as to extend slightly through a second exit aperture of the camera, the tab, throughout the aforesaid operations, bypassing the rolls. At this juncture, the tab passes beyond a guide bar, which has heretofore maintained it close to the plane of the leader and, because its direction is now markedly sideways, it separates from the leader and is removed from the apparatus entirely. The leader is left projecting from the camera, in readiness for use in performing the second stage of processing the film assembly.

The leader, when drawn upon at the second or processing stage, advances the superimposed sheets between the compressive means, releasing and spreading the processing liquid between given surfaces, and thence, from the camera. Each film assembly also includes a mask for defining the area covered by the liquid and thus determining the picture area, spacer means contributing to a given thickness of the spread processing liquid, and means for trapping any excess of the processing liquid and preventing its escape to a location outside the film assembly. Film assemblies of the aforementioned general category are described in detail in U.S. Patent No. 3,079,849, issued to Richard R. Wareham on March 5, 1963; U.S. Patent No. 3,080,805, issued to Joel A. Hamilton on March 12, 1963; and in the copending U.S. patent application of Rogers B. Downey, Serial No. 203,265, filed June 18, 1962. The aforesaid film assemblies are supplied in a light-tight container so as to constitute a film pack.

While the foregoing sequence of operations is disclosed in the above-referenced copending U.S. patent application of Rogers B. Downey, Serial No. 203,265, filed June 18, 1962, Patent No. 3,132,572, and is essentially that performed by the apparatus of the present invention, it is performed by this apparatus in a somewhat modified and distinctly more efficient manner. In this regard, it is to be emphasized that the photographic diffusion transfer process involved is an exceedingly delicate one, particularly where the process is one producing an image in full color. Thus, the improved processing operations which are made possible by the apparatus of the present invention may well provide the difference between an image which is defective as, for example, in its color properties, and one which is entirely satisfactory. It is to this end of insuring a perfect image through apparatus which eliminates certain detrimental frictional forces and which includes means compensating for certain inadequacies of the operator that the present invention is directed.

Referring now to the drawings, in FIGURE 1 is shown a photographic camera of the self-developing type, indicated generally by reference numeral 10 and including the usual camera body 12, lens and shutter housing 14, bellows 16, camera bed 18, and the usual linkages and supports for connecting such elements in the manner of a conventional folding camera. The film assemblies are mounted for exposure and processing within camera body 12, which includes appropriate means (not shown) such as a hinged connection which allows opening of the camera body or back to allow positioning therein of the film assemblies and, thereafter, closure of the back to maintain a light-tight interior. Camera 10 also includes film assembly processing apparatus comprising a number of elements, including a front pressure roll 20, rear pressure roll 22, tab guide bar 24 and control element 26, the structure and operation of which will be described in much greater detail hereinafter.

Although the film pack and individual film assemblies thereof constitute no part of the present invention they will be described in some detail to make clear the function of the apparatus. A plurality of film assemblies may conveniently be provided within a container, portions of which are shown in FIGURE 1 and indicated by reference numeral 28. Container 28 includes a frontal exposure opening 30 which faces the front of the camera and is positioned substantially at the focal plane thereof, and in registration with a similar exposure opening 31 in camera back 12, when the film pack has been inserted in the camera. The container also includes an end aperture 32 for withdrawal of the individual film assemblies from the container in a manner to be described later. For purposes of clarity and simplicity, only a single film assembly is shown in container 28 in the accompanying drawings. The film assembly, indicated generally by reference numeral 34, includes photosensitive sheet 36 and image-receiving sheet 38, connected by flexible strip 40 and leader 42. Tab 44 is initially attached to leader 42 near the leading edge thereof. Photosensitive sheet 36 is initially attached near its trailing end by means of staple 46, or other such convenient attaching means, to pressure plate 48, one of the functions of which is to maintain the photosensitive sheets of the film assemblies substantially flat in the focal plane during exposure. The purpose and function of each of the foregoing elements of the film assemblies will be explained more fully in connection with the description of FIGS. 7–11.

Camera 10 includes exit aperture means through which the individual film assemblies may be withdrawn. Such means include exit aperture 50, through which tab 44 is adapted to extend, and exit aperture 52, (FIG. 7) through which the remainder of the film assembly may be drawn. Pivotally mounted closure element 54 is biased by appropriate spring means (not shown) towards the position shown in FIGURE 1, wherein portions of element 54 cover exit aperture 52, thus aiding in maintaining the interior of camera back 12 in a light-tight condition. As initially supplied, the film pack includes an opaque covering sheet which maintains the pack in a light-tight condition prior to insertion in the camera. The cover sheet extends over exposure opening 30, around the film assemblies and out of exit aperture 32 of container 28. When the pack is positioned within the camera a leading portion of the cover sheet extends through exit aperture 50 of camera 10. The cover sheet may be withdrawn from the film pack and camera by manually pulling the leading portion which extends through exit aperture 50. Tab 44 of the first film assembly is releasably attached to the cover sheet and is pulled with, and finally separated from, the latter so as to extend through exit aperture 50 in the manner illustrated in FIGURE 1 after removal of the cover sheet. Film assembly 34 is shown in FIGURE 1 in the exposure position before any of the elements thereof have been advanced to begin the transport of the film assembly through the processing apparatus.

Figure 2:
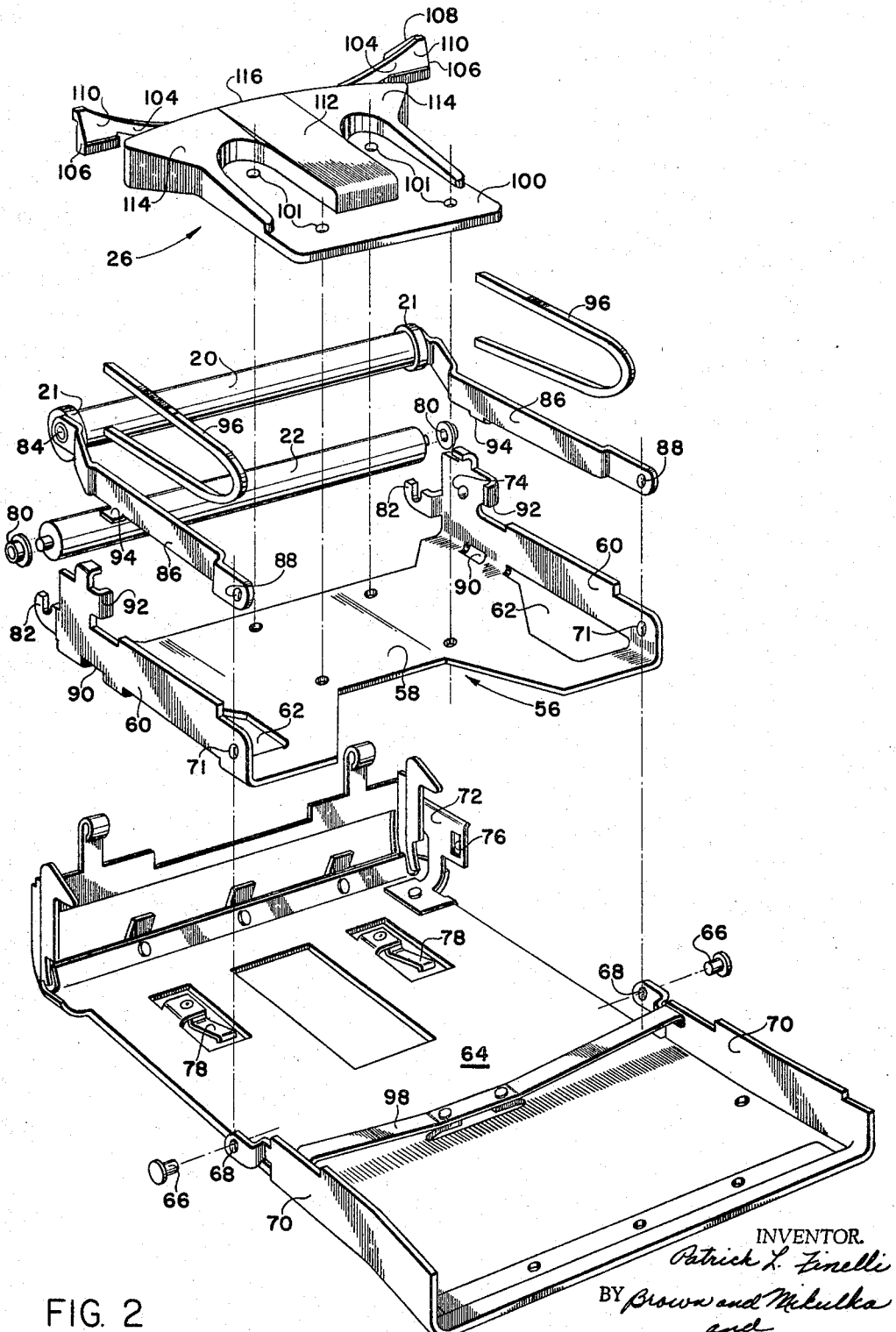
FIG. 2 is an enlarged, exploded, perspective view of certain elements of the apparatus of FIGURE 1.

In FIG. 2 the pressure roll mounting elements and the cooperating processing control elements are shown in detail. A support frame 56 or carriage, including transverse plane-like section 58 and a pair of forwardly extending, flange-like support members 60 at the sides thereof, serves as a basic support means for mounting control element 26 and rear pressure roll 22. Adjacent each side of support frame 56 is a cut-out area 62 serving a function to be described later and including portions of both section 58 and side support members 60. Support frame 56 is pivotally attached to mounting plate 64 by a pair of pivot elements 66 which extend through openings 68 in depending flange sections 70 of mounting plate 64, and openings 71 in side support elements 60 of support frame 56. Support frame 56 is releasably held in a closed position with respect to mounting plate 64 by a spring clip 72, attached to mounting plate 64, and engaging pin 74 which projects outwardly from side support element 60 through opening 76 in spring clip 72. Outward manual pressure on spring clip 72 removes pin 74 from its engagement in opening 76 of the clip and allows movement of support frame 56 and its associated elements about its pivotal mounting with respect to mounting plate 64. A pair of springs 78, extending outwardly from mounting plate 64 and bearing against support frame 56 when the latter is in its closed position, serves to take up any undesirable play and to resiliently maintain the support frame in a fixed reference position with respect to mounting plate 64 which is rigidly attached to the interior of camera body 12.

Rear pressure roll 22 is rotatably mounted upon forwardly extending, hook-shaped arms 82 of side support elements 60. Elements 60 may, alternatively, be considered as constituting a pair of support arms interconnected by the section 58 to form an integral structure. Front pressure roll 20 is rotatably mounted in bearing means 84 on end portions of support arms 86. The latter are pivotally mounted at the ends opposite bearing means 84 upon pivot means 66 which extend through openings 88 in a like manner to openings 71. Support arms 86 are capable of rotation about pivot means 66 independently of support frame 56. Accordingly, pressure roll 20 is capable of translational movement toward and away from pressure roll 22.

Each side support element 60 is provided with a slot 90 and inwardly extending ears 92. Support arms 86 also include a pair of outwardly extending ears 94. A pair of U-shaped springs 96 formed, for example, of square, oil-tempered steel wire stock, of a type having desirable low-rate and stress characteristics, are positioned between side support elements 60 and supporting arms 86. The open extremities of springs 96 are compressed when the spring is functionally mounted so that bias is applied divergingly. Springs 96 are mounted so that the upper extremity as seen in FIG. 2, of the open ends bears against the lower edges of ears 92 of side support elements 60, and the lower extremity bears downwardly on ears 94 of support arms 86. Portions of the closed ends of springs 96 are accommodated by cut-out areas 62 in support frame 56 which contribute to maintain the springs in a properly mounted position. Pivotal support arms 86, from which ears 94 project and on which latter elements one extremity of each spring bears, are thereby so biased as to urge pressure roll 20, carried by arms 86, toward relatively fixed mounted rear pressure roll 22 to the limits permitted by shoulders 21 on front roll 20. Slots 90 are adapted to accommodate ears 94 should any adjustment of tolerances require their use for the purpose. Spring 98 is attached to mounting plate 64, as seen in FIG. 2, and presses against the rearward sides of container 28, when the latter is mounted within camera 10, to urge the film pack towards that position wherein the photosensitive surface of sheet 36 is positoned substantially in the focal plane of the camera.

Figure 6:
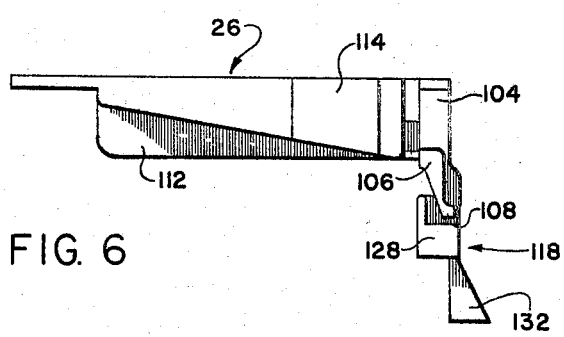
FIG. 6 is a side elevational view of the elements of FIG. 5.
Figure 3:
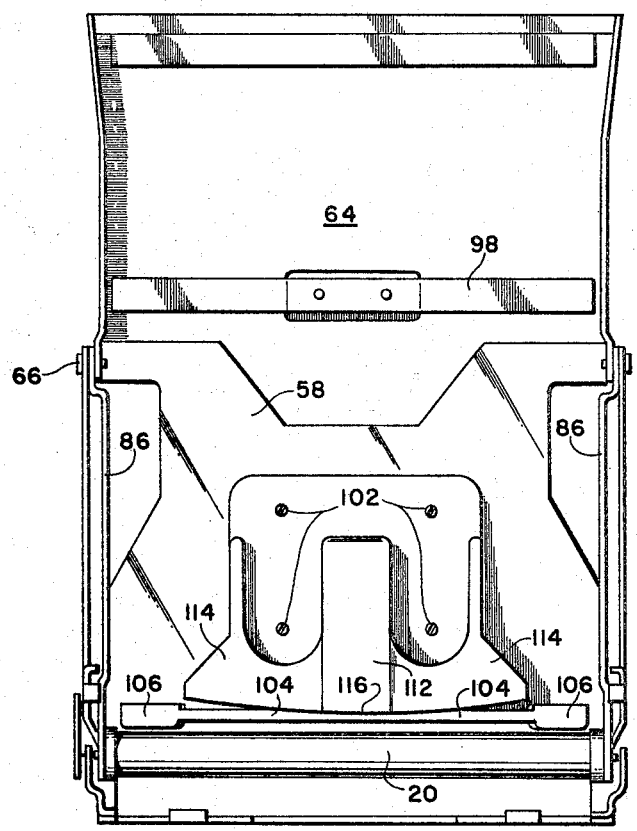
FIG. 3 is a plan view of a portion of the interior of the camera of FIGURE 1.

Control element 26 is preferably formed as a single unit, as by molding an appropriate plastic composition, the preferred properties of which will be later specified in more detail. Since control element 26 is substantially symmetrical on each side of its longitudinal center-line, like reference numerals will be used to denote like portions which appear on each side of the element. The control element includes plate-like portion 100 which includes openings 101 (FIG. 2), through which may extend screws 102 (FIG. 3) or other appropriate securing means, by means of which the control element is attached to support frame 56. Flexible arms 104 extend laterally from the portion of control element 26 closes to the pressure rolls. On the end of each flexible arm 104 are enlarged portions 106, each including a lip 108, which protrudes toward the pressure rolls, and a rear surface 110, on the opposite side of elements 106 from lips 108 and which is inclined from portion thereof nearest lips 108 away from the pressure rolls, as best seen in FIG. 6. Extending away from the plane of plate-like portion 100 are central portion 112 and side portions 114 which meet at the end of control element 26 closest the pressure rolls and terminate in leading edge 116 of the control element. As best seen in FIG. 3, leading edge 116 is curved with respect to the longitudinal axis of the pressure rolls, coming nearest to the rolls substantially at the center of both the control element and the rolls and curving slightly away from the rolls in both directions from the center. As may be seen in FIGS. 7–11, the surface of central portion 112 extends from leading edge 116 away from the pressure rolls substantially in the plane of the bite of the rolls, while side portions 114 slope from leading edge 116 away from this plane. Also, leading edge 116 extends transversely of control element 26 in a plane substantially parallel to the bite of the rolls.

Figure 4:
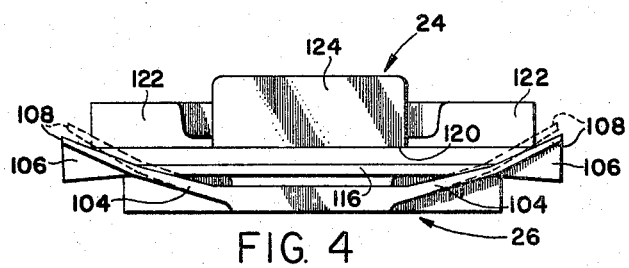
FIG. 4 is a front view of one embodiment of a pair of cooperable elements of the apparatus of the invention.
Figure 5:
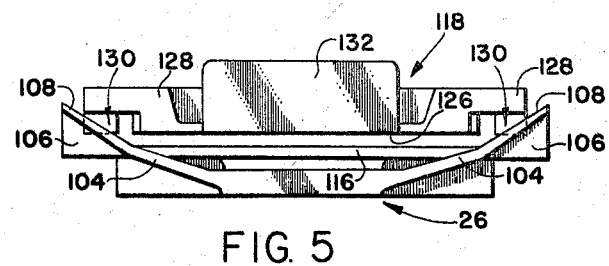
FIG. 5 is a front view of a second embodiment of the elements of FIG. 4.

Tab guide bar 24 is shown in front view in FIG. 4, and in side section in FIGS. 1 and 7–11, in conjunction with control element 26. A second embodiment of the tab guide bar, denoted by reference numeral 118, is shown in FIGS. 5 and 6 in conjunction with the control element. It will be noted from FIGURE 1 that tab guide bar 24 is mounted on a portion of camera back 12 which is movable relative to that portion of the camera back upon which control element 26 is mounted, whereby the guide bar and control element are moved toward and away from one another as camera back 12 is moved between its open and closed positions. Tab guide bar 24 includes a straight edge 120 which, when the camera back is closed, is positioned adjacent and parallel to the plane of leading edge 116 of control element 26. Tab guide bar 24 comprises, generally, block-like end portions 122 and sloping central portion 124. It will be noted that tab 44 initially extends from its attachment with the film assembly, over edge 120 of the guide bar and out exit aperture 50. Since central portion 124 of the guide bar is inclined from the point thereon nearest exit aperture 50 rearwardly towards edge 120, tab 44 is allowed to extend directly between edge 120 and that portion of closure element 54 which cooperates with the camera body to form exit aperture 50.

In FIG. 4 the free ends of flexible arms 104 are shown in two positions, one in dotted lines and one in solid lines. As previously mentioned, tab guide bar 24 and control element 26 are moved away from each other when camera back 12 is opened. The dimensions and relative positioning of the guide bar and control element are such that when the camera back is closed end portions 122 of tab guide bar 24 contact end portions 106 of flexible arms 104 of the control element. The normal, unflexed position of flexible arms 104 is indicated in dotted lines in FIG. 4, and is the position which the arms assume when the camera back is open. The position of the flexible arms and end portions thereof shown in solid lines represent the position to which the arms are flexed away from their normal position by contact thereof with end portions 122 of the tab guide bar when the camera back is closed. Although it is not necessary to the proper function of control element 26 during transport of a film assembly through the camera that arms 104 be flexed, as shown in FIG. 4, the tab guide bar and control element are so positioned with respect to one another in order to maintain a particular desired spacing between leading edge 116 of the control element and edge 120 of the tab guide bar, for reasons which will be explained later.

It is desirable for optimum performance of the apparatus with respect to a film assembly being transported therethrough for processing that the flexibility of arms 104 remain substantially unchanged throughout the life of the apparatus. Depending to some extent upon the particular material of which control element 26 is made, it is evident that arms 104 may take a "set" after the camera back has remained in the closed position for a long period of time with the arms flexed away from their normal position as shown in FIG. 4. It may therefore be desirable to provide means which allow the arms to remain unflexed when the camera back is closed. In the embodiment of FIGS. 5 and 6, although control element 26 is the same as in the other figures, the configuration of tab guide bar 118 is somewhat different from that of tab guide bar 24. Edge 126 does not extend the full length of tab guide bar 118 in a straight line as does edge 120 with respect to tab guide bar 24. End portions 128 of tab guide bar 118 each include a cutaway area 130 into which end portions 106 of flexible arms 104 may extend when the camera back is in the closed position. Hence, the flexible arms of the control element are allowed to remain in their normal, unflexed position when the camera back is closed as well as when it is open, and there is no danger of the arms taking a set because of being flexed away from their normal position whenever the camera back is closed. Central portion 132 of tab guide bar 118 may correspond exactly in configuration and function to central portion 124 of tab guide bar 24.

Figure 7:
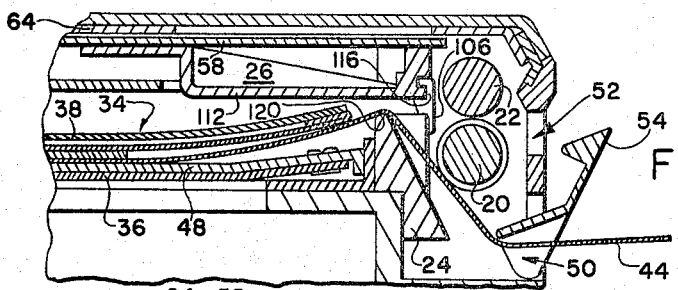
FIGS. 7–11 are a series of fragmentary, side views in cross section of portions of the apparatus of FIGURE 1 showing its function with respect to a film assembly during the several steps of advancement of such assembly through the apparatus.

After a photographic exposure of the photosensitive portion of sheet 36 has been effected through operation of the camera shutter, the film assembly is ready for transport through the camera to be withdrawn therefrom and processed. As previously mentioned, processing is effected by spreading a viscous fluid processing composition in a relatively thin layer between the latent image which has been formed in the photosensitive surface of sheet 36 and second sheet 38. This spreading is effected by rupturing a frangible container carrying the processing fluid by means of pressure rolls 20 and 22 as the film assembly is advanced therebetween. A portion of film assembly 34 is shown in FIG. 7 in substantially the same position as in FIGURE 1, but in somewhat greater detail. Tab 44 may be seen extending from its attachment with leader 42, over tab guide bar 24 and out exit aperture 50. Leader 42 is in turn attached at its trailing end to photosensitive sheet 36. Flexible strip 40 is attached to an intermediate portion of leader 42 and is then folded back upon itself and attached to second sheet 38. As film assembly 34 is withdrawn from container 28 and from camera 10, various elements of the film unit cooperate with pressure rolls 20 and 22, tab guide bar 24, and various portions of control element 26 to provide proper transport of the film unit through the apparatus and proper distribution of the processing fluid between the sheets of the film unit.

The purpose and operation of the various elements of the film assembly and processing apparatus within the camera will now be described with reference to FIGS. 7-11. When an operator pulls manually on tab 44 the force is transferred to leader 42 and to photosensitive sheet 36 by virtue of the interattachment of these elements. Due to the change in direction of tab 44 as it passes through exit aperture 50 and over tab guide bar 24, a portion of the pulling force will be transmitted to closure element 54, which will consequently be rotated in a clockwise direction about its pivotal mounting, as seen in FIG. 7, thus being moved to an open position with respect to exit aperture 52. When sufficient pulling force is applied to tab 44, photosensitive sheet 36 is torn away from the portion thereof which is secured by staple 46 to pressure plate 48. The point at which tab 44 is attached to leader 42 cannot be seen in FIG. 7, being spaced back from the leading edge of the leader.

Figure 8:
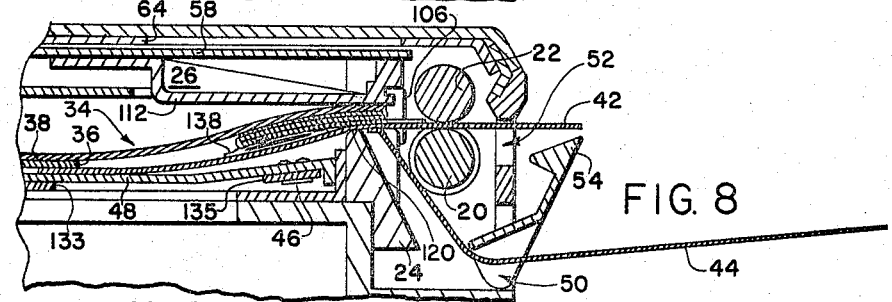
Figure 12:
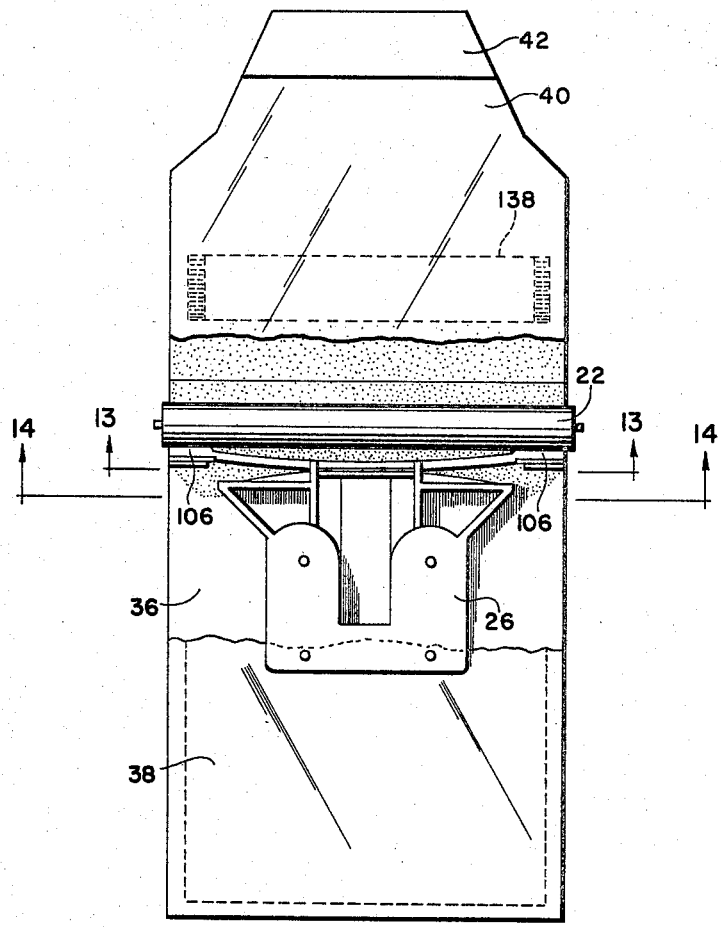
FIG. 12 is a plan view, seen from a position indicated by the line 12—12 of FIG. 11, showing a film assembly in an intermediate stage of its advancement through the apparatus, with a portion of the assembly broken away to show the approximate distribution of the processing agent between the layers of the film assembly at such stage in its advancement.

In FIG. 8 trailing edge 133 of photosensitive sheet 36 may be seen advancing toward the left with a small portion 135, from which the exposed portion of the sheet has been torn, still retained by staple 46. The photosensitive sheet passes around the radius at the end of pressure plate 48 which is not shown and the leading edge of the photosensitive sheet, which is attached to leader 42, may be seen advancing toward the right. As leader 42 is advanced the leading edge thereof passes between the pressure rolls and through exit aperture 52 as seen in FIG. 8. The frictional force between the leading portion of photosensitive sheet 36 and second sheet 38 tends to advance the second sheet toward the pressure rolls during advancement of the photosensitive sheet. However, it is necessary that the photosensitive and second sheets be advanced between the pressure rolls only after the leading edge of the photosensitive sheet has been substantially aligned with the leading edge of the second sheet. It is therefore necessary to provide means which prevent the leading edge of second sheet 38 from being advanced between the pressure rolls due to the frictional force exerted by leader 42 and photosensitive sheet 36. End portions 106 of flexible arms 104 are positioned in the path of the leading edge of second sheet 38 near the lateral edges thereof as the second sheet is advanced toward the pressure rolls. The leading edge of leader 42, being somewhat narrower than the leading edge of second sheet 38, as seen in FIG. 12, may pass between end portions 106 as the leader is advanced between the pressure rolls. Thus, second sheet 38 is restrained against further movement due to frictional force exerted thereon, by contact with rear surfaces 110 of end portions 106. Since flexible strip 40 has been folded back upon itself between its connections with second sheet 38 and leader 42, the fold begins to be removed as the end of flexible strip 40 which is attached to leader 42 is advanced therewith, and no force is exerted on the end of flexible strip 40 which is attached to second sheet 38.

Figure 9:
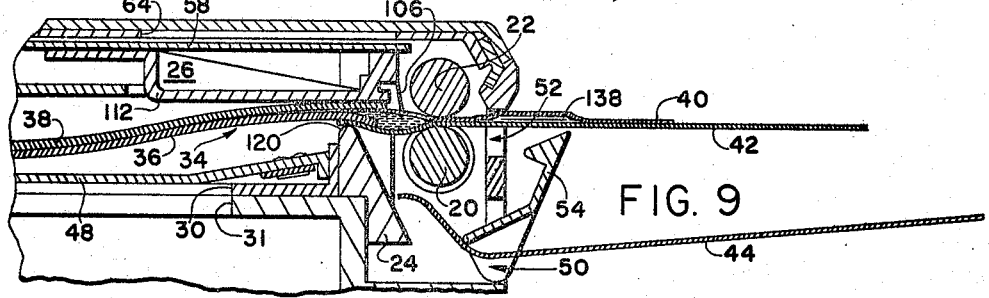

When the trailing edge of tab 44, which is attached to leader 42, passes edge 120 of tab guide bar 24, the direction in which the force is exerted on this trailing edge is changed. As seen in FIG. 8, the trailing edge of tab 44 has just passed edge 120 and the direction of the force exerted thereon is now towards exit aperture 50 rather than towards the pressure rolls. Continued pulling on tab 44 towards the right therefore causes the tab to separate from leader 42. As seen in FIG. 9, tab 44 has been separated from leader 42 and may be pulled through exit aperture 50 and discarded. After tab 44 has been separated from leader 42 the operator may grasp the leader and advance the film assembly between the pressure rolls and out exit aperture 52. As seen in FIG. 9, the film assembly has been advanced from its position of FIG. 8 by pulling on leader 42. After the narrow portion of leader 42 has been advanced past end portions 106, the wide portion of the leader will be drawn under the end portions, as will flexible strip 40, which substantially conforms an outline to leader 42. As seen in FIG. 8, the position of the elements of the film assembly is such that the widest portion of leader 42 has not yet been advanced to a position adjacent end portions 106. In FIG. 9, however, the assembly has been advanced to a point where the leading edges of photosensitive sheet 36 and second sheet 38 are in substantial alignment and the fold has been removed from flexible strip 40. Since the wide portion of leader 42 and flexible strip 40 is now adjacent end portions 106 and passes under the end portions and into the bite of the pressure rolls, a force is exerted upon end portions 106 urging them toward the pressure rolls. Since arms 104 are somewhat flexible the advancement of the film unit through the pressure rolls causes end portions 106 to be deflected from their initial position toward the bite of the rolls.

It will be noted that the distance between the attachment of flexible strip 40 to leader 42 and the attachment of second sheet 38 to the flexible strip is such that the fold or slack has been completely removed from flexible strip 40 when the leading edge of sheet 36 has been aligned with the leading edge of sheet 38. Up to the point in the advancement of the film assembly shown in FIG. 9, sheet 38 has remained substantially stationary since the only force exerted thereon has been the frictional force of photosensitive sheet 36 and marginal portions of the leading edge of second sheet 38 have been in contact with rear surface 110 of end portions 106 which effectively restrains further movement of the second sheet due to the aforementioned frictional force. Further advancement of leader 42 from the position shown in FIG. 9, however, will exert a positive advancing force on both photosensitive sheet 36 and second sheet 38. Sheet 36 will be advanced, as before, since it is directly attached to leader 42, which is manually advanced by the operator. Sheet 38 will now be advanced since it is attached to flexible strip 40, which in turn is attached to leader 42 and all of the slack has been removed from the flexible strip.

Figure 10:
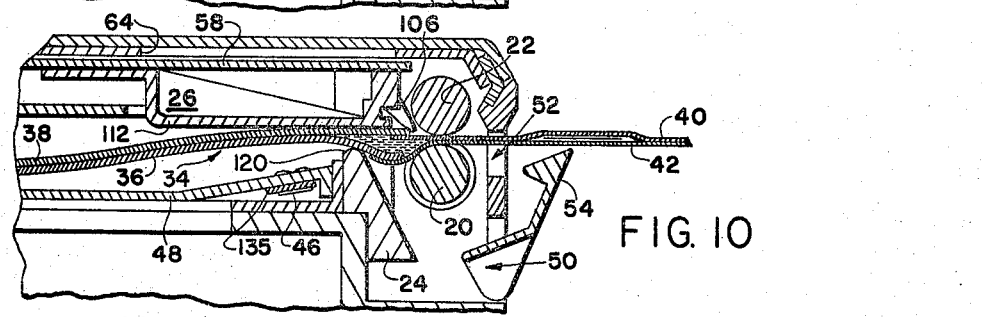

In FIG. 10 the film assembly is shown after being advanced only a short distance from the position of FIG. 9. Since a positive advancing force is now exerted on second sheet 38, the leading edge of the sheet will be drawn under end portions 106 since rear surfaces 110 thereof are tapered, as seen in FIG. 6, and since flexible strip 40 already passes under end portions 106, as previously explained. Edge 120 of tab guide bar 24 lies in a plane substantially parallel with the bite of the pressure rolls, whereby the film assembly tends to be maintained in this plane as it is advanced between the rolls.

Figure 11:
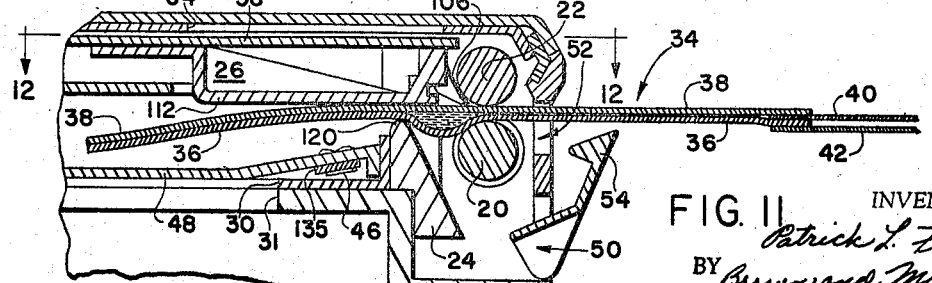

The normal position of end portions 106 extends somewhat below this plane, whereby the lateral edge portions of the film assembly would tend to be slightly deformed out of the said plane by being drawn under end portions 106. However, since arms 104 are flexible, end portions 106 tend to be deflected upward (as seen in FIGS. 7–11) by contact therewith of sheet 38, into the plane of the film assembly as it extends between the bite of the pressure rolls and edge 120 of tab guide bar 24. Also, the forward advancement of the film assembly will tend to deflect end portions 106 toward the pressure rolls. As seen in FIG. 11 the film assembly is in an intermediate stage of its advancement after the leading edges of sheets 36 and 38 have passed through the pressure rolls. Lip 108 of end portion 106 may be seen to be closely adjacent the bite of the pressure rolls. Although end portion 106 is deflected to the position shown by contact with sheet 38, the natural bias of flexible arm 104, tending to return end portion 106 to its initial position, causes pressure to be applied to the lateral edges of the film assembly by end portions thus, in effect, pinching the edges of the film assembly between end portions 106 and pressure roll 20.

Figure 13:
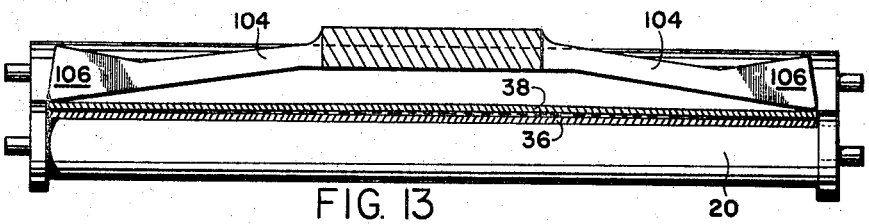
FIG. 13 is an enlarged elevational view in section on the line 13—13 of FIG. 12.

As collapsible container 138 is drawn between the pressure rolls a fluid processing composition is released therefrom by rupturing of the container along its trailing edge. As the film assembly continues to be advanced between the pressure rolls the processing composition is spread in a relatively thin layer between the exposed portion of photosensitive sheet 36 and second sheet 38. The gap between pressure rolls 20 and 22, which is maintained by shoulders 21 on roll 20, effectively establishes the thickness of the fluid layer between the sheets as they are drawn between the rolls, as best seen in FIG. 13. In addition to the gap between the pressure rolls, the fluid thickness may also be controlled by spacer elements positioned between the lateral edge portions of sheets 36 and 38 according to a well-known method of fabricating such film units. It has been found convenient to provide flexible strip 40 initially with a trailing portion conforming substantially in external dimensions to second sheet 38, and to cut away a rectangular center portion from such trailing end. When second sheet 38 is used for forming a positive image the rectangular cut-away portion will define the borders of such image. The rectangular area thus defined, a portion of which may be seen in dotted lines in FIG. 12, is that area between which the fluid processing composition must be spread in order to effect development of the latent image carried by photosensitive sheet 36 and transfer such image as a positive photographic image to second sheet 38.

Figure 14:
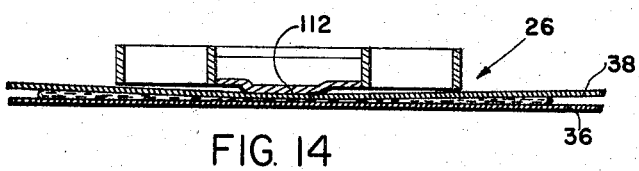
FIG. 14 is an elevational view in section on the line 14—14 of FIG. 12.

When the processing liquid is released from container 138 by passing of the latter between the pressure rolls it is caused to flow, to some extent, in a direction opposite to the direction of film assembly advancement. If the sheets between which the liquid is released are not held against separation the liquid tends to concentrate in the center thereof and form a longitudinal band which may fail properly to cover the image area. As seen, for example, in FIG. 11 edge 120 of tab guide bar 24 is closely adjacent the outer surface of control element 26. Thus, as the film assembly is advanced sheets 36 and 38 are restrained against separation across their entire width at a point rearward of the pressure rolls. Since central portion 112 of control element 26 extends from leading edge 116 in a plane substantially parallel with the bite of the pressure rolls, the central portion of sheet 38 will be prevented from being forced upward by any tendency of processing fluid to remain in the center of the sheets as the assembly is advanced. This tends to force the fluid to move from the center position of the film assembly toward the lateral edges as seen in FIG. 14.

Leading edge 116 of control element 26 exerts a supplementary pressure, along a transverse curved line, thus operating against separation of the layers of the film assembly and modifying somewhat the direction of flow of the fluid processing agent between sheets 36 and 38. When initially released from container 138 the fluid tends to have its greatest concentration at the center, as previously mentioned. The pressure of leading edge 116 upon the outer surface of sheet 38 retards the tendency of the fluid to flow past the leading edge, i.e., to be distributed between sheets 36 and 38 at points farther from the pressure rolls than the leading edge. Thus, the fluid is allowed to be distributed in a longer path, that is, farther from the pressure rolls, on the sides than in the center where leading edge 116 comes closest to the pressure rolls. The approximate distribution of the fluid at an intermediate stage of the advancement of the film assembly through the pressure rolls may be seen in FIG. 12. Furthermore, that portion of the fluid which is distributed rearwardly (with respect to the pressure rolls) of leading edge 116 also tends to be forced away from the center and toward the edges by central portion 112 of the control element, as previously explained in connection with FIG. 14.

Owing to the heightened compression of the processing liquid closely adjacent the bite of the pressure rolls, a considerable turbulence of the liquid is generated in this area, producing bubbles therein. These bubbles tend to be dissipated prior to completion of the spreading process, thus preventing impairment of the resulting image, by the greater distance for which the fluid extends away from the pressure rolls by virtue of the sheets being restrained against separation. Through its location closely adjacent the pressure rolls, less pressure is required of leading edge 116 than would be the case if it were more remotely located. Edge 120 of tab guide bar 24 cooperates in restricting the sheets against separation by urging the film assembly toward edge 116 and supporting it against pressure by the latter. Whereas edge 120 supports the film assembly across its entire width, edge 126 of tab guide bar 118, the embodiment of FIGS. 5 and 6, does not provide such support immediately adjacent each lateral edge of the assembly due to cut-out portions 130, provided for the purposes previously described.

In summation, it may be seen that at least three separate functions are performed by control element 26 with respect to the film assemblies to insure their proper transport through the apparatus and proper spreading and distribution of the processing fluid. First, the leading edge of sheet 38 contacts rear surfaces 110 of end portions 106 on the control element to restrain the sheet from premature advancement between the pressure rolls. The sheet is allowed to be so advanced, at the proper time, by the taper of rear surfaces 110 toward the bite of the pressure rolls, thus releasing sheet 38 without significant additional pulling force and without scuffing the leading edge of the sheet.

Secondly, flexible arms 104 allow end portions 106 to be drawn towards the pressure rolls through the frictional force exerted by advancement of the film assembly. Lips 108 are drawn to a position very close to the bite of the rolls and the bias exerted by the flexible arms tending to return to their normal positions pinches the lateral edges of sheets 36 and 38 between end portions 106 and pressure roll 20. Thus, processing fluid is prevented from escaping from between the lateral edges of the sheets by applying pressure at a point very closely adjacent the bite of the rolls and without the necessity of crimping the edges of the plane of the bite of the rolls.

Thirdly, control element 26, due primarily to the shape and position of leading edge 116 and central portion 112, insures proper spreading of the fluid processing composition by forcing the fluid away from its natural point of greatest concentration at the center of the assembly and toward the edges. Also, the layers of the film assembly are restrained against separation by edge 120 of the tab guide bar and by the control element, with previously explained advantages resulting.

Not only do the various portions of control element 26 and tab guide bar 24 combine to perform the functions explained above in a superior manner, but the unique functional configuration of the control element allows convenient one-piece fabrication thereof, thereby permitting more economical manufacturing. Since flexible arms 104 of the control element are employed in the manner of precision springs it is necessary to choose a material having proper flexural strength limits and section modulus if the entire control element is to be molded as a single piece. Materials which have been found to be structurally satisfactory as well as economical include polycarbonate and acetal plastics. Specific examples of such plastics are those having the trade names Celcon and Delrin, manufactured by E. I. du Pont de Nemours and Co. of Wilmington, Delaware, U.S.A. Such materials are also satisfactory for fabrication of the tab guide bar. It is also preferred that a clear plastic be used, at least for fabrication of control element 26, which remains in rather close proximity to the film while the latter is loaded in the camera. This is because the more common pigments, such as carbon black, used to color plastics contain sulphur which may outgas formaldehyde and fog the film. Such materials as nylon are undesirable since they tend to absorb moisture and do not maintain the necessary dimensional stability.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Processing apparatus adapted to be incorporated with a photographic camera for use with a film assembly including a photosensitive sheet, a second sheet, and a contained processing liquid adapted to be released under compression and spread between said sheets, said apparatus comprising, in combination:

(a) a pair of elongated pressure-applying members between which said film assembly may be advanced in a direction substantially perpendicular to the longitudinal axis of said members for releasing said processing liquid and spreading the latter between said sheets;

(b) a pair of margin-engaging elements located adjacent an entrance area of said pressure-applying members;

(c) said margin-engaging elements being laterally spaced by a distance slightly less than the width of said film assembly and initially extending across the plane of advancement of said film assembly through said pressure-applying members, whereby opposite marginal areas of one of said sheets slidingly engage said margin-engaging elements during advancement of said film assembly; and (d) resilient mounting means permitting movement of said margin-engaging elements in a plurality of directions, whereby the force exerted on said elements by said film assembly during advancement thereof tends to move said elements out of said plane of advancement and toward said entrance area, whereby said opposite marginal areas are slidingly engaged between said elements and one of said pressure-applying members closely adjacent said entrance area.

2. The invention according to claim 1 wherein said pressure-applying members comprise a pair of rotatably mounted pressure rolls.

3. The invention according to claim 1 wherein said margin-engaging elements are positioned at the extremities of a pair of flexible arms.

4. Processing apparatus adapted to be incorporated with a photographic camera for use with a film assembly including a photosensitive sheet, a second sheet, and a contained processing liquid adapted to be released under pressure and spread between said sheets, said apparatus comprising, in combination:
  (a) a pair of elongated pressure-applying members between which said film assembly may be advanced in a direction substantially perpendicular to the longitudinal axis of said members for releasing said processing liquid and spreading the latter between said sheets;
  (b) a pair of margin-engaging elements located adjacent an entrance area of said pressure-applying members;
  (c) said margin-engaging elements being laterally spaced by a distance slightly less than the width of said film assembly and initially extending across the plane of advancement of said film assembly through said pressure-applying members, whereby opposite marginal areas of one of said sheets slidingly engage said margin-engaging elements during advancement of said film assembly;
  (d) resilient mounting means permitting movement of said margin-engaging elements in a plurality of directions, whereby the force exerted on said elements by said film assembly during advancement thereof tends to move said elements out of said plane of advancement and toward said entrance area, whereby said opposite marginal areas are slidingly engaged between said elements and one of said pressure-applying members closely adjacent said entrance area; and
  (e) a working surface rigidly mounted with respect to said pressure-applying means and positioned rearwardly of said pressure-applying means in said plane of advancement;
  (f) said working surface further having a width substantially less than that of said film assembly and centrally positioned with respect thereto, whereby a central portion of one of said sheets slidingly engages said working surface during advancement of said film assembly, thereby subjecting said central portion to a bearing force and causing said processing liquid to flow outwardly therefrom.

5. The invention according to claim 4 wherein said resilient mounting means comprise a pair of flexible arms extending outwardly from a fixed mounting centrally adjacent said pressure-applying means.

6. Processing apparatus adapted to be incorporated with a photographic camera for use with a film assembly including a photosensitive sheet, a second sheet, and a contained processing liquid adapted to be released under pressure and spread between said sheets, said apparatus comprising, in combination:
  (a) a pair of elongated pressure-applying members between which said film assembly may be advanced in a direction substantially perpendicular to the longitudinal axis of said members for releasing said processing liquid and spreading the latter between said sheets;
  (b) a pair of margin-engaging elements located adjacent an entrance area of said pressure-applying members;
  (c) said margin-engaging elements being laterally spaced by a distance slightly less than the width of said film assembly and initially extending across the plane of advancement of said film assembly through said pressure-applying members, whereby opposite marginal areas of one of said sheets slidingly engage said margin-engaging elements during advancement of said film assembly;
  (d) resilient mounting means permitting movement of said margin-engaging elements in a plurality of directions whereby the force exerted on said elements by said film assembly during advancement thereof tends to move said elements out of said plane of advancement and toward said entrance area, whereby said opposite marginal areas are slidingly engaged between said elements and one of the pressure-applying members closely adjacent said entrance area; and
  (e) a member having a leading edge of predetermined curvature positioned rearwardly of said pressure-applying means and substantially in said plane of advancement so as to extend laterally across said film assembly during advancement thereof, whereby a transverse area of said film assembly is subjected to a differential bearing force just prior to entrance between said pressure-applying means.

7. The invention according to claim 6 wherein said leading edge is nearest said pressure-applying members at the longitudinal center thereof and curves rearwardly away from said members on each side.

8. The invention according to claim 7 wherein said margin-engaging elements are spaced apart by a distance greater than the straight-line distance between the ends of said leading edge.

9. Processing apparatus adapted to be incorporated with a photographic camera for use with a film assembly including a photosensitive sheet, a second sheet, and a contained processing liquid adapted to be released under pressure and spread between said sheets, said apparatus comprising, in combination:
  (a) a pair of elongated pressure-applying members between which said film assembly may be advanced in a direction substantially perpendicular to the longitudinal axis of said members for releasing said processing liquid and spreading the latter between said sheets;
  (b) a pair of margin-engaging elements located adjacent an entrance area of said pressure-applying members;
  (c) said margin-engaging elements being laterally spaced by a distance slightly less than the width of said film assembly and initially extending across the plane of advancement of said film assembly through said pressure-applying members, whereby opposite marginal areas of one of said sheets slidingly engage said margin-engaging elements during advancement of said film assembly;
  (d) resilient mounting means permitting movement of said margin-engaging elements in a plurality of directions, whereby the force exerted on said elements by said film assembly during advancement thereof tends to move said elements out of said plane of advancement and toward said entrance area, whereby said opposite marginal areas are slidingly engaged between said elements and one of said pressure-applying members closely adjacent said entrance area;
  (e) a working surface rigidly mounted with respect to said pressure-applying means and positioned rearwardly of said pressure-applying means in said plane of advancement;
  (f) said working surface further having a width substantially less than that of said film assembly and centrally positioned with respect thereto, whereby a central portion of one of said sheets slidingly engages said working surface during advancement of said film assembly, thereby subjecting said central portion to a bearing force and causing said processing liquid to flow outwardly therefrom; and
  (g) a member having a leading edge of predetermined curvature positioned rearwardly of said pressure-applying means and substantially in said plane of advancement so as to extend laterally across said film assembly during advancement thereof, whereby a transverse area of said film assembly is subjected to a differential bearing force just prior to entrance between said pressure-applying means.

10. The invention according to claim 9 wherein said leading edge is substantially wider than said working surface, the latter being bounded at its nearest proximity to said pressure-applying means by said leading edges.

11. The invention according to claim 10 wherein said resilient mounting means comprise a pair of flexible arms, the extremities of which comprise said margin-engaging elements.

12. The invention according to claim 11 wherein said flexible arms extend outwardly from a fixed mounting centrally adjacent said pressure-applying means and removed from said plane of advancement.

13. Processing apparatus for incorporation with a photographic camera of the type having a pair of pressure rolls between which a film assembly, including a photosensitive sheet, a second sheet and a contained processing liquid, are advanced to effect release and spreading of said liquid, said apparatus comprising:

(a) a first element having a working surface rigidly mounted with respect to said camera and lying in a first plane passing through the bite of said pressure rolls and perpendicular to a plane passing through the longitudinal axes of said rolls;

(b) said working surface having a first leading edge spaced rearwardly from said pressure rolls, whereby said film assembly slidingly engages said working surface prior to entering said bite;

(c) a second element having a second leading edge, substantially parallel to said first plane and spaced therefrom by a fixed predetermined distance, whereby said film assembly is advanced between said first and second elements before entering said bite;

(d) a pair of margin-engaging elements located adjacent an entrance area of said pressure-applying members;

(e) said margin-engaging elements being laterally spaced by a distance slightly less than the width of said film assembly and initially extending across the plane of advancement of said film assembly through said pressure-applying members, whereby opposite marginal areas of one of said sheets slidingly engage said margin-engaging elements during advancement of said film assembly; and (f) resilient mounting means permitting movement of said margin-engaging elements in a plurality of directions, whereby the force exerted on said elements by said film assembly during advancement thereof tends to move said elements out of said plane of advancement and toward said entrance area, whereby said opposite marginal areas are slidingly engaged between said elements and one of said pressure-applying members closely adjacent said entrance area.

14. The invention according to claim 13 wherein said first and second elements are respectively mounted upon separate, relatively movable parts of said camera.

References Cited by the Examiner

UNITED STATES PATENTS 3,132,572   5/1964   Downey _____ 95—13

JOHN M. HORAN, *Primary Examiner.*

UNITED STATES PATENT OFFICE
CERTIFICATE OF CORRECTION

Patent No. 3,264,963                                    August 9, 1966

Patrick L. Finelli

It is hereby certified that error appears in the above numbered patent requiring correction and that the said Letters Patent should read as corrected below.

Column 12, lines 14 to 16, strike out "having the trade names Celcon and Delrin, manufactured by E. I. duPont de Nemours & Co. of Wilmington, Delaware, U.S.A." and insert instead -- manufactured and sold under the trademark "Delrin" by E. I. duPont de Nemours & Co. of Wilmington, Delaware, U.S.A. and under the trademark "Celcon" by Celanese Corporation of America, Plastics Division, Newark, New Jersey, U.S.A. --; column 14, line 1, for "the pressure" read -- said pressure --; column 15, line 2, for "edges" read -- edge --.

Signed and sealed this 5th day of September 1967.

(SEAL)
Attest:

ERNEST W. SWIDER                                  EDWARD J. BRENNER
Attesting Officer                               Commissioner of Patents